United States Patent [19]

Lemelson

[11] 4,318,874
[45] Mar. 9, 1982

[54] MOLDING APPARATUS

[76] Inventor: Jerome H. Lemelson, 85 Rector St., Metuchen, N.J. 08840

[21] Appl. No.: 950,017

[22] Filed: Oct. 10, 1978

Related U.S. Application Data

[63] Continuation-in-part of Ser. No. 483,037, Jun. 25, 1974, Pat. No. 4,120,922, and a continuation-in-part of Ser. No. 297,452, Oct. 13, 1972, Pat. No. 3,820,928, which is a continuation of Ser. No. 849,014, Aug. 11, 1969, abandoned, which is a continuation-in-part of Ser. No. 721,401, Apr. 15, 1968, Pat. No. 3,616,495, and Ser. No. 421,817, Dec. 29, 1964, and Ser. No. 439,549, Mar. 15, 1965.

[51] Int. Cl.$^3$ ............................................. B29F 1/06
[52] U.S. Cl. .................................. 264/40.1; 264/255; 264/328.8; 264/328.13
[58] Field of Search ................... 264/255, 40.1, 40.7, 264/328.3, 328.13

[56] References Cited

U.S. PATENT DOCUMENTS 2,337,550 12/1943 Crosby ..................... 264/255 X

Primary Examiner—Thomas P. Pavelko

[57] ABSTRACT

A molding apparatus is provided for molding one or more liquid molding materials, such as thermoplastic or thermosetting resins and the like which are controllably flowed into a closed mold cavity wherein the instant rate of flow and pressure of the molding material are predeterminately varied during a molding cycle so as to control and predetermine the shape and physical characteristics of the articles molded thereby. In one form, a closed loop automatic control system is employed to predeterminately control and vary the rate of flow of molding material to a mold cavity so as to optimize the molding procedure and predetermine the physical characteristics of the molded article.

5 Claims, 2 Drawing Figures

4,318,874

MOLDING APPARATUS

RELATED APPLICATIONS

This is a continuation-in-part of U.S. Pat. Application Ser. No. 483,037 filed June 15, 1974 entitled Method For Molding, now U.S. Pat. No. 4,120,922 a continuation-in-part of Ser. No. 297,452, 10/13/72 now U.S. Pat. No. 3,820,928 which was a continuation of Ser. No. 849,014 filed Aug. 11, 1969, now abandoned, a continuation-in-part of Ser. No. 721,401 filed Apr. 15, 1968, now U.S. Pat. No. 3,616,495 and Ser. No. 421,817, filed Dec. 29, 1964, and Ser. No. 439,549 filed Mar. 15, 1965 which had, as a parent application, Ser. No. 734,340 filed Mar. 9, 1958 now U.S. Pat. No. 3,173,175.

SUMMARY OF THE INVENTION

This invention relates to a molding apparatus for molding liquid molding materials such as plastic resins which solidify after being injected into a mold by the addition of heat thereto or a catalyst, as in the case of a thermosetting resin or by the removal of heat therefrom, as in the case of a molten thermoplastic resin. Automatic control is effected of such molding variables as the rate of flow of components of a molding material, one or more molding materials, in certain instances, a decorating material together with a molding material, to the cavity of a mold wherein control of the molding operation including a plurality of variables thereof, is automatically effected.

Heretofore, most molding operations, such as low or high pressure injection molding, die casting and other forms of molding molten of liquid polymers and metals, have been performed wherein the molding material is injected into the mold at a substantially constant rate of flow by driving an injection screw or piston at substantially constant speed or by suddenly opening a valve in the line between the injector and a source of pressurized molding material such as a quantity thereof located in an accumulator. Articles molded by the described procedure in which flow rate or pressure is substantially constant after the initial surge of molding material through the injector, have suffered certain shortcomings in structure and appearance, the severity and characteristics of which shortcomings is a function of the characteristics of the molding material, the shape of the mold cavity, the viscosity of the molding material and the rate of flow thereof into the mold.

The instant invention is concerned with a molding apparatus and method for molding articles in a mold wherein the rate of flow of molding material is controlled and may be predeterminately varied during a molding cycle so as to obtain the optimum or desired characteristics of the molded article. In one form, an open loop control system is provided wherein an analog signal is generated as reproduced from a recording thereof or from any suitable analog signal generating means and the signal is applied to control a servo device such as a motor operable to open and close a valve in the molding material inlet line or a feeding device such as a screw or piston. In a closed loop control system, an analog signal is generated at a known time in a molding cycle as an input reference signal and a feedback signal is generated by a transducer, such as a pressure transducer, disposed in the inlet line or the mold cavity wall. The feedback signal is bucked against the reference signal in a comparator and a difference signal is generated which is applied to control the servo operating the pump, screw or valve controlling rate of flow.

Accordingly it is a primary object of this invention to provide a new and improved molding apparatus and method for molding molten materials by injection into a cavity of a mold wherein the rate of flow of injection material may be predeterminately varied during each molding cycle so as to variably increase and decrease the pressure of the flowing material and thereby effect control over and predetermine the physical characteristics of the molded article.

Another object is to provide a molding apparatus which is automatic in its molding operation and wherein the molding cycle variables are predeterminately controlled by electrical signals which may not only be repeated from cycle to cycle but may be easily changed to vary the physical characteristics of the same molded shape, to optimize the physical characteristics of a plurality of different shaped articles formed in different molds or to permit experiments to be performed without difficulty so as to obtain moldings of optimum characteristics or having characteristics which are predetermined.

Another object is to provide a molding apparatus employing feedback signal generating means associated with the mold itself to assure that a commanded flow rate is being carried out during molding.

Another object is to provide a control system for an injection molding machine capable of predeterminately controlling substantially all molding variables.

Another object is to provide a computer controlled molding apparatus.

Another object is to provide a hybrid molding control system employing analog signals for controlling rate of flow of molding material and digital or pulse signals for controlling other variables such as mold closure and opening.

With the above and such other objects in view as may hereinafter more fully appear, the invention consists of the novel constructions, combinations and arrangements of parts as will be more fully described and illustrated in the drawings but it is to be understood that changes, variations and modifications may be resorted to which fall within the scope of the invention as claimed.

IN THE DRAWINGS

Figure 1:
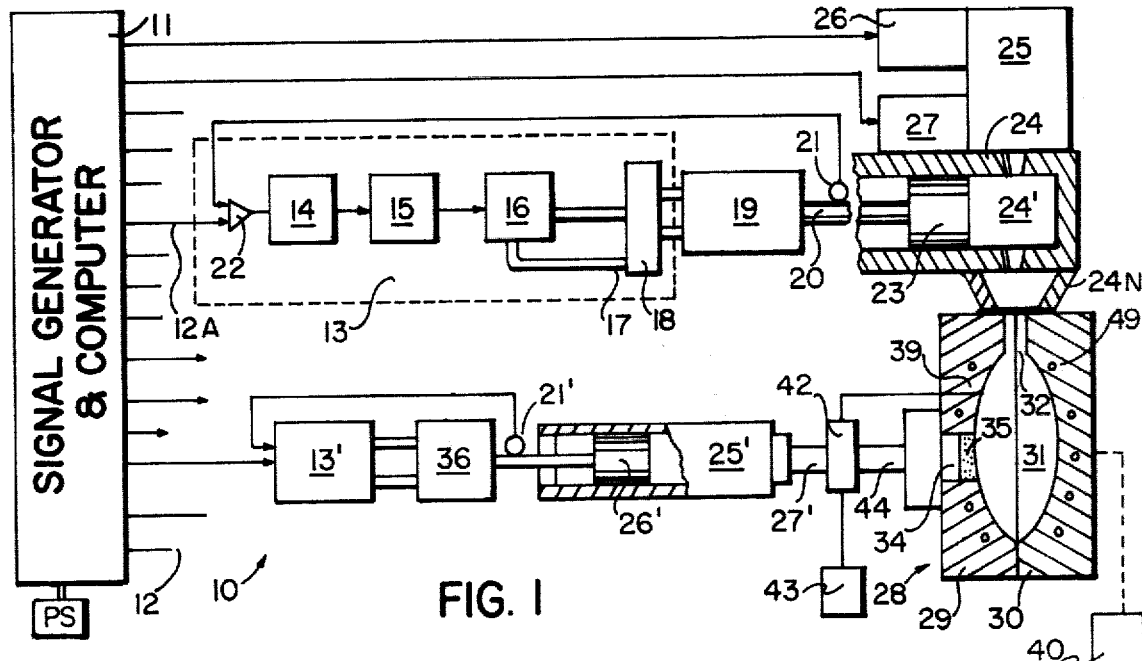
FIG. 1 is a schematic diagram showing components of a molding apparatus and a master controller for controlling the operation of said apparatus.

Referring now to the drawings, there is shown in FIG. 1 a control system for a molding apparatus 10 which is operative to controllably feed one or more molding materials to the cavity 31 of a two-part mold 28 composed of mold sections 29 and 30, at least one of which is movable with respect to the other to effect the opening and closing of the mold. In FIG. 1, a servo 40, such as a hydraulic actuator or cylinder is operative to open and close the mold 28 by lineally moving the mold section 30 with respect to the mold section 29 a degree in opening to permit removal of the molded article from the mold cavity 31. The actuator 40 is preferably operative in response to signals generated by a program controller or computer which will be described and which also controls other variables associated with the molding apparatus such as the injection of molding material, mass rate of flow of said material, the flow of heat transfer fluid through the mold walls, the flow of decorating material to the mold and any auxiliary equipment associated with the molding operation.

In FIG. 1, two closed loop control systems are illustrated, one to predeterminately control the injection and flow of a molding material into the mold cavity and the other for controlling the flow of a decorating material or a second molding material to the mold cavity. Control of all molding variables including the direct control of the servos or valves for operating mold actuators, is effected by means of a master controller 11 which, in a preferred form of the invention, comprises a sequential signal generator having a plurality of outputs 12 including at least one output extending to each of the servo controls and the closed loop control systems for controlling the flow of molding material and, in those cases where applicable, the flow of decorating material to the mold. The sequential signal generator may, in its simplest form, comprise a multi-circuit, recycle timer or, in a more complex form, a digital computer operative to generate command control signals and to apply same to the inputs of the various controllers of the system. In the form illustrated in FIG. 1, the master controller 11 preferably comprises means for generating a plurality of analog control signals and pulse signals on the outputs 12 thereof, such as a magnetic recorder containing an endless recording member such as an endless belt, drum or disc having a plurality of record tracks at least certain of which have respective analog control signals recorded thereon to variably control devices such as platons or screws for feeding molding materials and, in certain instances, decorating materials to the mold.

Shown coupled to the inlet passageway or sprue 32 of the mold is an injection nozzle 24N extending from an injection head 24 terminating a chamber 25 containing molding material which is heated and dispensed into interior volume 24' of injection head 24 and a piston 23 by means of a motor 26 driving a feed screw located within chamber 25. Injection molding material may be rendered molten in chamber 25 and fed by means of an extrusion screw through a solenoid operated valve 27 located between chambers 25 and 24. When the piston 23 is retracted, motor 26 may be operated by means of a signal generated by signal generator 11 to drive the screw or piston located in chamber 25 and valve 27 may be opened by a second signal generated as reproduced from a second track of the signal generator 11 so as to admit a predetermined quantity of molten molding material to the volume 24'. Thereafter, the piston 23 is advanced at a predetermined velocity which may remain constant during the molding cycle or may vary according to the characteristics of the analog signal generated by the sequential signal generator 11 and utilized to control the operation of the means driving said piston. Forward movement of piston 23 is operative to force molten molding material in the volume 24' out of the nozzle 24N and into the cavity 31 of the mold 28. The actuator 19 for the piston 23 is a hydraulic cylinder having an output shaft 20 connected to the piston 23, said output shaft being variably projectable in a manner such that its position and velocity may be predeterminately controlled by an analog signal generated by signal generator 11 as reproduced from a particular track, for example, of the magnetic recording member therein.

The hydraulic cylinder 19 is automatically controlled by an electro-hydraulic controller 13 composed of an electric stroker for controlling the position of a slide block of a variable displacement hydraulic pump 16 through a hydraulic stroker 15. The characteristics of the variable displacement hydraulic pump 16 are such that the pump may pump hydraulic fluid in either direction so that the position as well as the direction of the piston 25 connected to the shaft 20 of the hydraulic cylinder 19 will be a function of the amplitude of the analog signal reproduced from the channel of signal generator 11 which is used to control the electro-hydraulic controller 13.

A feedback signal indicative of the position of the shaft 20 of the hydraulic cylinder 19 is generated by a variable potentiometer 21 having a wiper arm which is coupled by means of gears or other suitable means to rotate respectively in a clockwise and counterclockwise direction with the forward and reverse movement of shaft 20. The potentiometer 21 generates a feedback signal which is a function of the position of shaft 20. The feedback signal is bucked against the reference signal generated by sequential signal generator 11 on a line 12a extending to a comparator 22, such as a summing amplifier. The difference signal output of the comparator 22 is used to control the electric stroker 14. The electric stroker, in turn, controls a valve plunger through precision gearing and effects control of the hydraulic stroker 15 which controls the output of the hydraulic pump 16. The output line 17 of the hydraulic pump is connected to the input 18 of the hydraulic cylinder 19. The stroke in position of the output shaft 20 of cylinder 19 is therefore predeterminately controlled in accordance with the characteristics of the analog signal generated on the input 12a to the comparator 22. Thus, by varying the characteristics of the analog signal recorded in the sequential signal generator 11, the movement of piston 23 may be predeterminately varied so as to predeterminately determine or vary the velocity and rate of flow of molding material forced by said piston through the injection nozzle 24N into the mold cavity 31 as further defined in Ser. No. 416,219.

One or more additional injection nozzles operatively coupled to the input sprue or passageway 32 or to other passageways extending to the cavity 31 of the mold may extend from respective other feed chambers similar to 24 in which drive pistons or screws are movable by means similar to that described above for operating piston 23 so as to predeterminately control the flow of one or more other molding materials into the mold cavity 31 in accordance with the flow of the molding material through nozzle 24N. By variably and predeterminately controlling the flow of said molding material or materials, the characteristics of an article molded in the cavity 31 of the mold may be predeterminately controlled and part shrinkage may be controlled, minimized or eliminated thereby.

Also shown in FIG. 1 is a second injection apparatus for molding or decorating material. This second apparatus is composed of a cylinder 25' containing a piston 26' for forcing molding or decorating material disposed within the cylinder 25' through an output line 27' which extends to a passageway 34 extending through the wall of the mold member 29 and having a porous plug 35 disposed within said passageway and defining a portion of the wall of the molding cavity. Decorating material may thus be forced from cylinder 25' to the passageway 34 and through the porous member 35 disposed therein at a predetermined time during a molding cycle such that a portion of said material is deposited on and decorates the surface of the molding formed in the mold.

The piston 26' of cylinder 25' is connected to the output shaft of a hydraulic cylinder actuator 36 which is similar in operation to the actuator 19 described and is controlled in its operation in a manner similar to the manner in which cylinder 19 is controlled. Notation 13' refers to an electro-hydraulic control block having components similar to those found in block 13 and comprising a comparator, an electric stoker, a hydraulic stroker, a variable displacement pump and a feedback potentiometer riding on the shaft of the cylinder 36 for providing a feedback signal to assure that the operation defined by the analog signal generated on the input to the controller 13' is effected.

Depending on the location of the analog signal recorded on the record member of the sequential signal generator 11 and utilized to control the operation of the cylinder 36, the material disposed within cylinder 26' may be predeterminately timed and controlled in its rate of flow into the porous member 35 or mold cavity in accordance with the flow of primary molding material through nozzle 24N.

Also shown in FIG. 1 is a pressure transducer 39 which is secured in the mold wall and located so as to have its active element compressed, either directly or indirectly, by means of the pressure of the molding material injected into the mold cavity. The transducer 39 is connected to the control input of a solenoid operated valve 42 which, upon becoming actuated by a signal received from said transducer, suddenly admits a fluid such as air, decorating fluid or molding material from an accumulator 43 to a line 44 for either pressurizing the porous member 35 to prevent the flow of primary molding material through said porous member or for admitting decorating or molding material to the mold. The signal so generated by the transducer 39 may also be operative to close a valve in the line extending to the porous member 35 to prevent the backflow of molding material through said porous member. If decorating material is admitted to the input line and a valve in the line is closed by a signal received from the transducer 39, said fluid material being substantially incompressible, prevents molding material from entering and flowing through the porous member 35 in the input line extending thereto.

Thus, it is seen that the apparatus of FIG. 1 may be operated in a variety of different modes, depending on the characteristics of the molding material or materials admitted to the mold and a decorating material, if applicable, admitted to the mold or a porous portion of the wall of the mold cavity as described.

It is noted that the apparatus of FIG. 1 may be used for producing or decorating composite articles in a single mold which articles may be injection molded or die cast of two or more of such materials as plastics, ceramics or metals or combinations of these materials.

Figure 2:
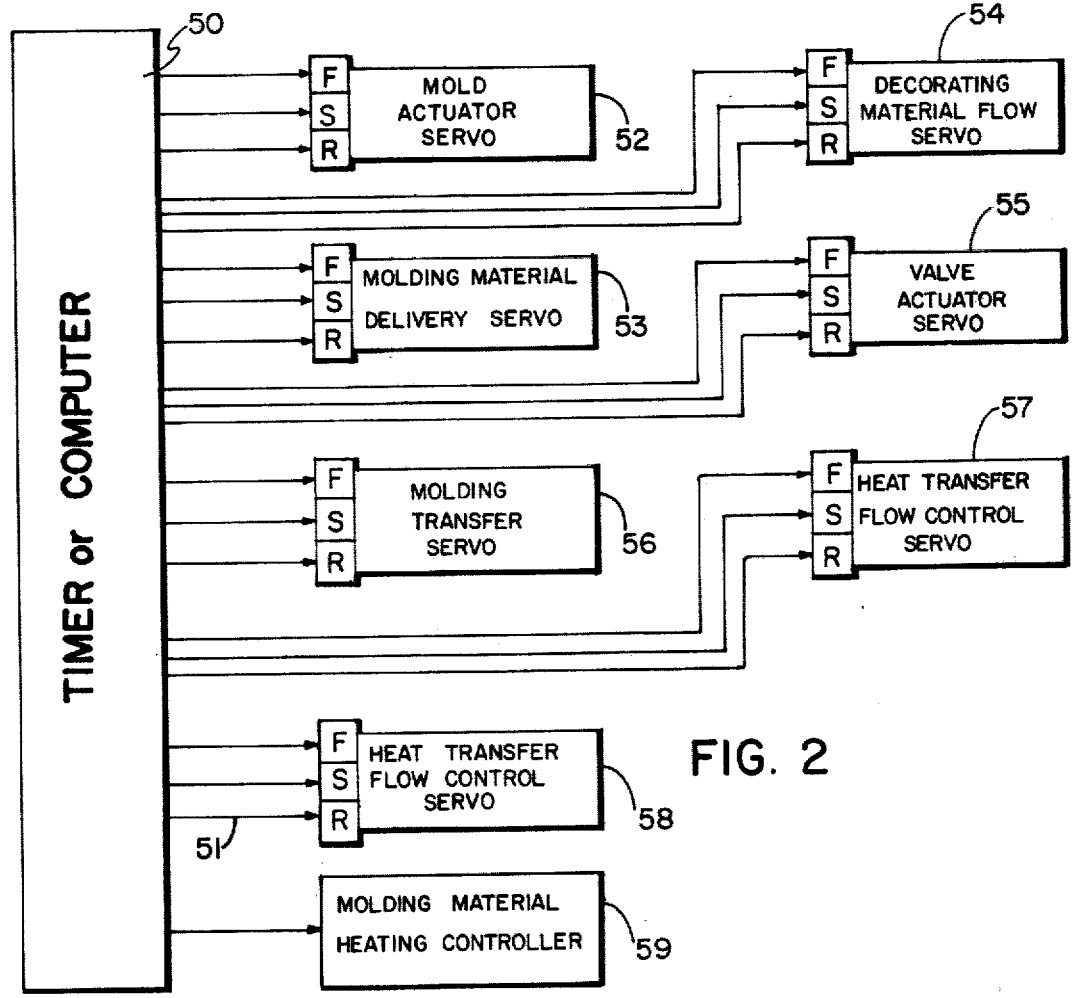
FIG. 2 is a schematic diagram showing feedback control loops for a plurality of devices operative to admit different materials to a mold.

In FIG. 2 is shown a modified form of control system for a molding apparatus which is a modified form of that shown in FIG. 1. A master controller 50 has a plurality of output lines 51 on which are generated respective control signals in timed relationship to each other, which signals are fed to forward, stop and reverse controls designated F, S and R of various servo motors denoted 52-58 for controlling the various devices associated with the molding apparatus. A first servo motor 52, for example, controls the opening and closing of one mold part with respect to the other to permit the removal of the molded article from the mold cavity and to close the mold with a sufficient clamping pressure to permit molding material to be molded therein. A second servo 53 controls the delivery of the molding material by predeterminately operating a piston or screw feeding molten molding material to the mold cavity through an injector as described. A further servo similar to 53 may also be employed to flow a second molding material to the mold cavity through the same inlet through which the first molding material is flowed or through a second inlet to the mold.

A third servo 54 is operative to predeterminately control the flow of a decorating material to a passageway in the mold, as described, having a porous member disposed within the mold cavity wall and defining the characteristics of the decoration to be printed on the surface of the molding formed in the mold.

Another servo member 55 is used to control a valve for admitting back pressure air to the inlet line through which decorating material is flowed to the mold so as to prevent backflow of molding material through said line.

The servo motors 57 and 58 are utilized respectively to control the flow of heat transfer fluid through the mold. Motor 57 is operative, when activated by a signal derived from the computer 50 to pump hot liquid or gas through the passageways 49 provided in the mold wall while motor 58, when activated by a signal generated by the computer 50 is operative to pump coolant or a refrigerant through said mold wall passageways. Thus if a thermosetting resin is injected into the mold, the mold wall may be predeterminately heated prior to and/or during the filling of the mold cavity with said resin. Thereafter the computer or controller 50 may be operative to control motor 58 to pump refrigerant or coolant liquid through the mold passageways to rapidly cool the mold prior to removing the part from the mold. Certain thermoplastic resins, such as high temperature resins, may also provide better molded parts when the mold wall is predeterminately heated prior to the injection thereof into the mold cavity. The computer or self-recycling controller 50 may thus be programmed to control not only the operation and timing of the servos used to pump heat transfer liquid through the mold but also the rate of flow of said fluids by metering same or controlling the operating speed of the motors.

The apparatus described may also be utilized to advantage in the art of die casting or injection molding metals where the quality of the finished casting or metal molding is directly related to such process variables as the pressure applied to the injected metal, the temperature of the metal, the temperature of the die, and the fill time required for a given die cavity. These variables generally require close scrutiny and are varied at present by a skilled operator based on his experience by manually adjusting various controls therefore. Accordingly, a further controller 59 is provided for variably controlling temperature of the molding material and is operated by a signal derived from the computer 50 and/or a sensor adapted to measure said temperature and generates a feedback signal to be bucked against a command signal generated by the computer. The resulting difference signal may be used, for example to control a motor used to control a variable potentiometer for variably controlling the voltage applied to an induction or resistance heating means for a furnace or other means for heating the molding material so as to predeterminately heat same prior to injection or flow into the mold.

Further adaptive control means applicable to the apparatus of FIGS. 1 and 2 may be provided in the form of sensors or transducers disposed within or coupled to the supply chamber 25, the accumulator or injection chamber 24', the mold cavity 31, the mold wall or passageways 49 therein and in any auxilliary means associated with the described molding apparatus for generating feedback or adaptive control signals which vary with variations in such process variables as molding material temperature prior to injection, molding material flow during injection into the mold or to the accumulator, mold temperature, molding material pressure during flow into the mold and within the mold and the temperature of the molding while in the mold. Said transducer generated signals may be bucked against reference signals generated by the computer in a comparator device such as a summing amplifier applied to control the servo or other device utilized to effect predetermined changes in the variable being controlled for predeterminately controlling same.

When two or more molding materials are fed to a mold cavity the temperature, pressure and flow of each may be monitored during the injection operation by suitably placed sensors as described which may generate feedback signals for predeterminately controlling the flow of each by the means described above so as to predeterminately dispose each material in the mold with respect to the other material and thereby predetermined the locations of said materials in the finished molding.

I claim:

1. A method for molding articles comprising:
   generating a first reference signal defining a command control signal and applying said first signal to initiate the operation of a first motor operating a first prime mover for a first molding material,
   generating a first feedback signal indicative of the operation of said first motor,
   summing said first command control signal and said first feedback signal and generating a first difference signal,
   applying said first difference signal to control said first motor to operate in a manner to predetermine the flow of said first molding material to said mold cavity,
   generating a second reference command signal and applying said second command signal to initiate operation of a second motor operating a second prime mover for a second molding material,
   generating a second feedback signal indicative of the operation of said second motor,
   summing said second command signal and said second feedback signal and generating a second difference signal and
   applying said second difference signal to control said second motor to operate in a manner to predetermine the flow of said second molding material to said mold cavity whereby predetermined quantities of said first and second molding material are simultaneously admitted to the cavity of said mold.

2. A method for molding articles composed of a plurality of materials which are flowed from separate supplies of such materials comprising:
   controllably flowing first and second liquid molding materials from respective first and second reservoirs, each containing supplies of said first and second molding materials, to a common mold cavity of a mold by:
   generating a first reference command control signal and applying said first control signal to control the operation of a first motor operated means for effecting flow of said first molding material from said first reservoir to said mold cavity,
   generating a first feedback signal indicative of the rate of flow of said first molding material from said first reservoir to said mold cavity,
   summing said first command control signal and said first feedback signal to generate a first difference signal, and
   applying said first difference signal to control said first motor operated means to cause said first molding material to predeterminately flow to said mold cavity,
   generating a second reference command control signal and applying said second command signal to control the operation of a second motor operated means for effecting flow of said second molding material from said second reservoir to said mold cavity,
   generating a second feedback signal indicative of the rate of flow of said second molding material from said second reservoir to said mold cavity,
   summing said second command control signal and said second feedback signal to generate a second difference signal, and
   applying said second difference signal to control said second motor operated means to cause said second molding material to predeterminately flow to said mold cavity whereby predetermined quantities of said first and second molding materials predeterminately enter said mold cavity.

3. A method in accordance with claim 2 wherein said first and second reference command control signals are simultaneously generated to simultaneously cause said first and second molding materials to predeterminately flow to said mold cavity.

4. A method in accordance with claim 3 wherein said first and second command control signals are operable to cause said first and second materials to occupy respective predetermined portions of said mold cavity.

5. A method in accordance with claim 4 wherein said first and second command control signals are operable to cause said first molding material to occupy substantially the entire volume of said mold cavity and said second molding material to occupy a small portion of the volume of said mold cavity immediately adjacent the wall of said mold cavity.

* * * * *